United States Patent [19]

Major

[11] Patent Number: 4,505,381
[45] Date of Patent: Mar. 19, 1985

[54] CONVEYOR ROLLER

[75] Inventor: Harry Major, Grosse Pte. Woods, Mich.

[73] Assignee: Harry Major Machine and Tool Co., Fraser, Mich.

[21] Appl. No.: 623,633

[22] Filed: Jun. 25, 1984

Related U.S. Application Data

[63] Continuation of Ser. No. 496,927, May 23, 1983, abandoned.

[51] Int. Cl.³ .................. B65G 13/00; B65G 39/00
[52] U.S. Cl. .................................. 198/781; 198/783
[58] Field of Search .............. 198/781, 783, 789, 790, 198/791, 624, 631, 780; 193/35 R, 37; 209/308

[56] References Cited

U.S. PATENT DOCUMENTS

| | | | |
|---|---|---|---|
| 1,067,805 | 7/1913 | Diescher | 198/624 |
| 1,990,227 | 2/1935 | Fairchild | 198/780 |
| 2,701,049 | 2/1955 | Kendall et al. | 198/781 |
| 2,743,004 | 4/1956 | Wright | 198/631 |
| 2,973,093 | 2/1961 | Erickson | 198/789 |
| 3,266,617 | 8/1966 | Forsyth et al. | 198/127 |
| 3,372,806 | 3/1968 | Porter | 209/308 |
| 3,942,338 | 3/1976 | Furlette et al. | 198/781 |
| 3,958,684 | 5/1976 | Garzelloni | 198/127 R |
| 3,980,172 | 9/1976 | Degood | 198/781 |
| 4,042,101 | 8/1977 | Krammer et al. | 198/781 |
| 4,047,609 | 9/1977 | Nazuka | 198/690 |
| 4,109,782 | 8/1978 | Nakai | 198/781 |
| 4,164,280 | 8/1979 | Duttine et al. | 198/781 |
| 4,266,660 | 5/1981 | Herman | 198/781 |
| 4,345,684 | 8/1982 | Rolland | 198/781 |
| 4,401,208 | 8/1983 | Allmacher, Jr. | 198/781 |

*Primary Examiner*—Joseph E. Valenza
*Assistant Examiner*—Daniel R. Alexander
*Attorney, Agent, or Firm*—Basile, Weintraub & Hanlon

[57] ABSTRACT

A roller for a roller conveyor has a circular outer article engaging surface and a transversely extending through bore. A rotatable drive shaft extends through the bore for rotating the roller. The bore in the roller is offset from the transverse center of the roller to cause an eccentric rotational movement of the outer surface of the roller.

3 Claims, 3 Drawing Figures

CONVEYOR ROLLER

This application is a continuation, of application Ser. No. 496,927, filed 5/23/83 now abandoned.

BACKGROUND OF THE INVENTION

1. Field Of The Invention

This invention relates, in general, to conveyors and, more specifically, to roller conveyors.

2. Description Of The Prior Art

In many industries, conveyors are employed to convey articles, parts, etc., between various assembly or work stations. A typical conveyor is a so-called roller conveyor which includes a plurality of aligned rollers rotated by a drive means, such as a motor-driven chain and sprocket assembly. One or more rollers are mounted on each of a series of aligned drive shafts to propel the articles, parts, etc., along the conveyor.

Due to tolerance build-up in the manufacture of each roller, it is difficult to precisely align the rollers along the plane of the conveyor to provide a flat surface along which the articles are conveyed. Thus, the upper surface of successive rollers can vary in height such that one or more rollers can be disposed slightly above the upper surface of the adjacent rollers. Furthermore, the conveyed articles frequently have projections or variations in the surface which engage the conveyor, such as flash on a casting. Such projections or protrusions can engage the roller which is raised slightly above the proceeding rollers and stop the article or part from making further progress along the conveyor.

The undesirable build-up of tolerances in rollers is a particular problem in friction-type roller conveyors in which each roller is constructed of the plurality of components, each of which has varying size tolerances. Particularly, each roller includes an inner roller which is mounted on and rotated by a drive shaft. An outer roller is concentrically mounted about the inner roller and is frictionally driven by the inner roller. When an article is stopped on the conveyor for a work operation, the weight of the article causes the outer roller to stall or slip with respect to the rotating inner roller until the article is again released for further movement along the conveyor. Due to the tolerance on each component of the friction roller, the overall roller size may vary by an amount which can lead to frequent stoppage of articles along the conveyor as noted above.

Thus, it would be desirable to provide a conveyor roller which overcomes the problems of previously devised conveyor rollers in which the build-up of tolerances in the rollers results in an uneven article conveying surface which causes frequent and undesired stoppage of articles as the articles are being conveyed along the conveyor. It would also be desirable to provide a conveyor roller for a friction-type roller conveyor which is both inexpensive to manufacture and adaptable to many different applications.

SUMMARY OF THE INVENTION

The present invention is a roller for a roller conveyor. The conveyor roller has an outer article engaging surface and a transversely extending through bore. A rotatable drive shaft extends through the transverse bore and rotates the roller. The transverse bore in the roller is offset from the center of the roller to cause eccentric rotational movement of the outer article engaging surface of the roller.

In a roller conveyor having a plurality of side-by-side aligned rollers, the angular orientation of the offset portions of adjacent rollers can be varied. In this manner, the outer article engaging surface of each roller moves in an eccentric path upon rotation of the roller and will alternately engage and disengage the article being conveyed along the conveyor. This movement of the article engaging surfaces of the rollers overcomes any tolerance build-up that may be present in the rollers which previously has made it difficult to precisely align the rollers in the same plane and has resulted in frequent and inadvertant stoppage of the articles along the conveyor when the articles strike rollers having a large tolerance build-up.

The unique conveyor roller of the present invention overcomes these problems due to the eccentric mounting of the roller on its rotatable drive shaft. The angular position of the offset portions of each roller can be adjusted between successive rollers to insure that even those rollers which may be slightly elevated above the preceding roller will drop below the plane of the upper surface of the preceding roller such that articles being conveyed along the conveyor will continue to move along the conveyor.

The conveyor roller of the present invention is particularly suited for use in friction-type rollers having both inner and outer roller portions. Further, the conveyor roller is both inexpensive to manufacture and can be provided with varying amounts of eccentric movement so as to permit its use in many different conveyor applications.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
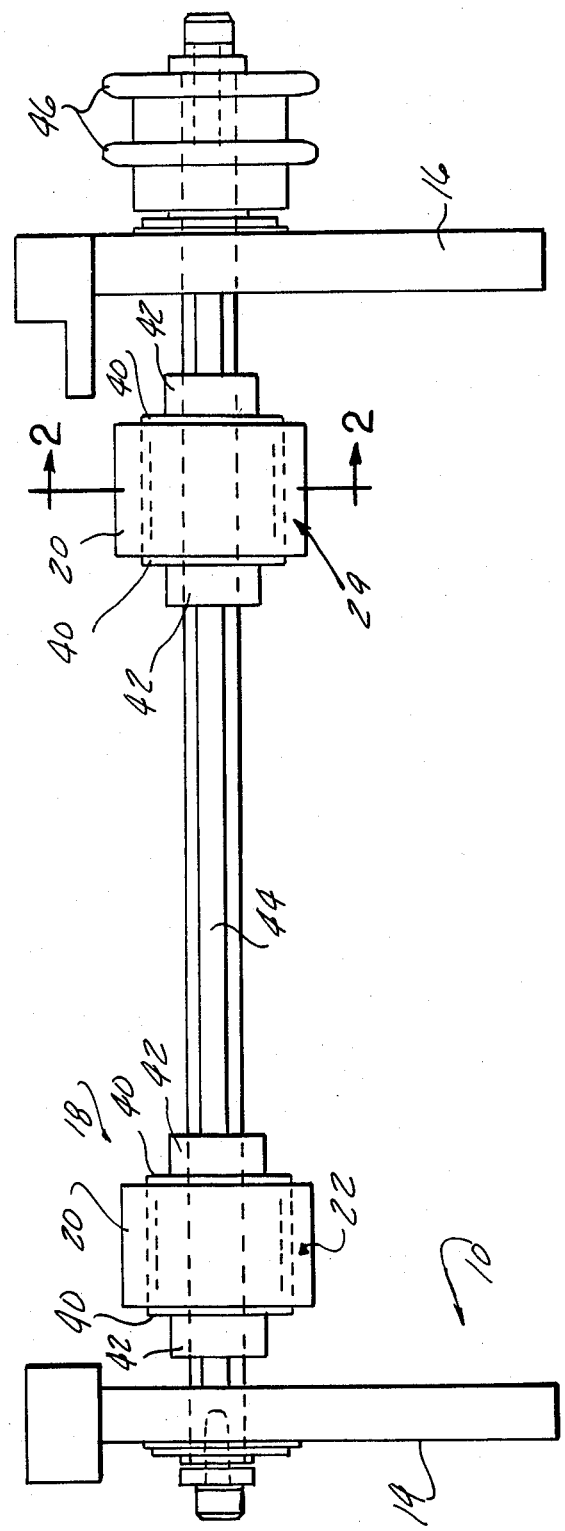
FIG. 1 is an end view of a conveyor having a pair of conveyor rollers of the present invention mounted thereon.

Throughout the following description and drawing, an identical reference number is used to refer to the same component shown in multiple figures of the drawing.

Figure 3:
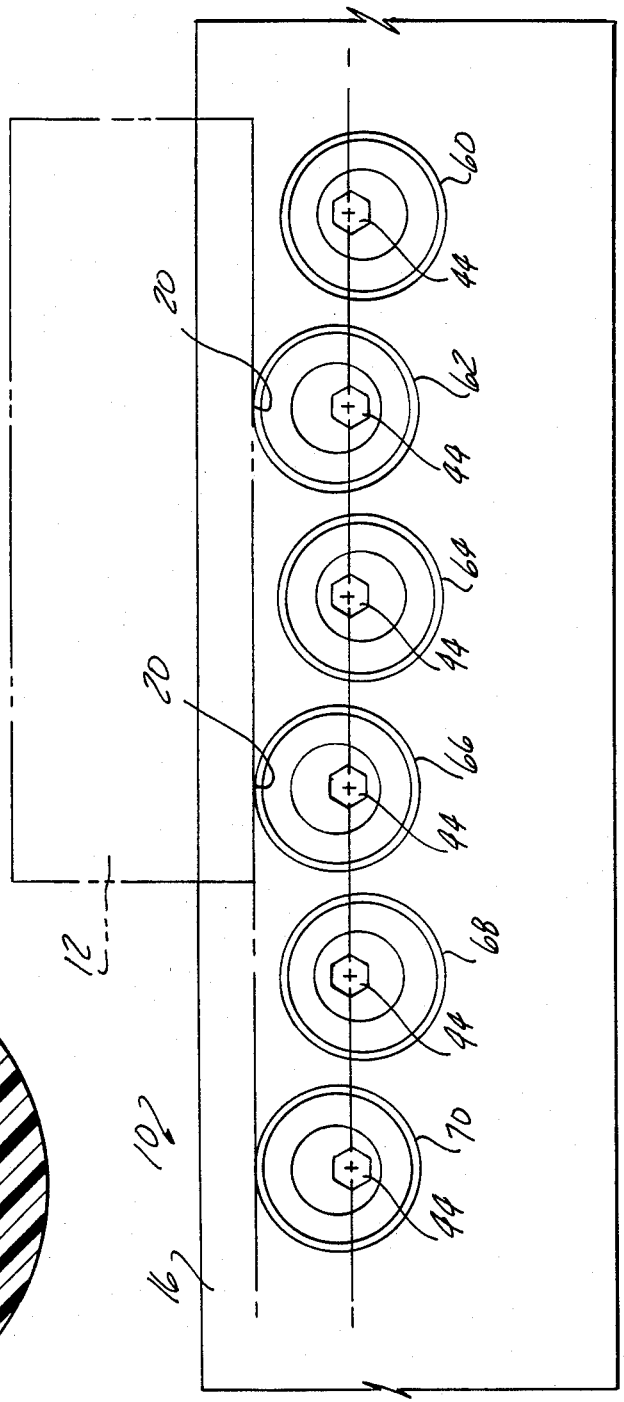
FIG. 3 is a side elevational view of the conveyor shown in FIG. 1 having a plurality of aligned conveyor rollers constructed in accordance with the teachings of the present invention mounted thereon.

Referring now to FIGS. 1 and 3, there is illustrated a roller conveyor 10 for transporting articles 12 along a predetermined path. As is conventional, the conveyor 10 includes a pair of spaced, side rails 14 and 16 which support roller means 18 therebetween.

The roller means 18 generally has a circular cross-section, with the outer periphery of the roller means 18 defining an article engaging surface 20 which propels the articles 12 along the conveyor 10.

The roller means 18 may have any suitable configuration, such as a single roller which extends between and is rotatably mounted at opposed ends to the side rails 14 and 16. Alternately, the roller means 18 may comprise two or more co-axially aligned rollers which are mounted on a drive shaft rotatably supported on the rails 14 and 16.

By way of example and not limitation, the conveyor 10 of the present invention is constructed as a roller conveyor having a plurality of pairs of friction-type rollers 22 and 24, with each roller pair being mounted on a rotatable drive shaft. Although only two rollers 22 and 24 are depicted as being mounted on a common drive shaft, it will be understood that any number of rollers may be utilized and disposed at any spacing along the drive shaft.

Figure 2:
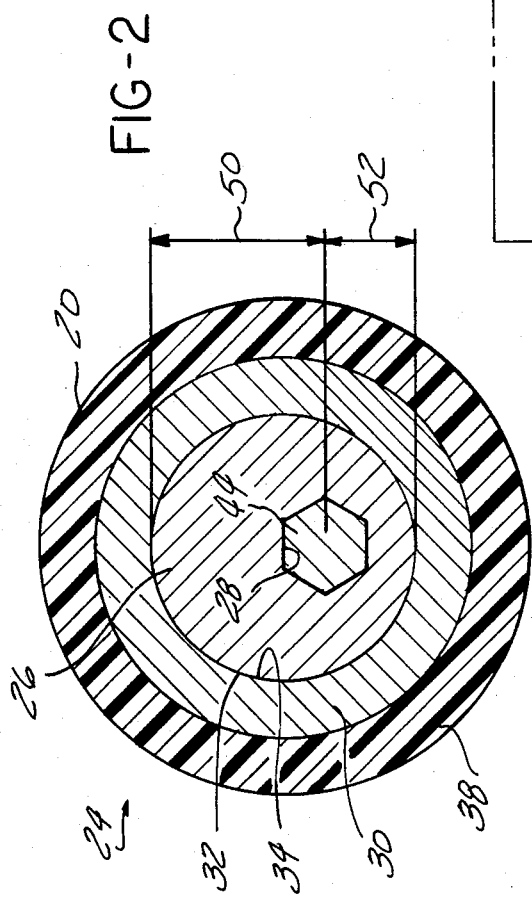
FIG. 2 is a cross-sectional view generally taken along line 2—2 in FIG. 1.

As shown in FIG. 2, each of the rollers, such as roller 24, is provided with an inner roller portion 26 having a circular cross-section and a transversely extending through bore 28. The bore 28 may have any cross-section, such as hexagonal, square, circular, etc. An outer roller portion 30 is rotatably mounted about the periphery of the inner roller portion 26 such that the inner surface 32 of the outer roller portion 30 frictionally engages the outer surface 34 of the inner roller portion 26.

Rotation of the inner roller portion 26 causes rotation of the outer roller portion 30 by means of the frictional contact between the mating surfaces 32 and 34. The outer roller portion 30 can also slip with respect to the rotating inner portion 26 when an article 12 is stopped for a work operation along the conveyor 10.

A protective coating 38 may optionally be on the periphery of the outer roller portion 30 to form the article engaging surface 20 of the roller 24. The protective coating 38 may be formed of any suitable wear resistant material and is typically used to convey articles having a high degree of surface finish.

As shown in FIG. 1, a pair of retainers 40 are mounted on the opposite sides of the outer roller portion 30 and engage the outwardly extending surface of the inner roller 26 so as to maintain the outer roller portion 30 in position on the rotating inner roller portion 26. A pair of clamps 42 are mounted on a drive shaft 44 and are secured thereto to maintain the operative components of the roller 24 in position on the drive shaft 44.

It will also be understood that other means for retaining the roller 24, as well as the various components thereof, in position on the drive shaft, such as spacer tubes, enlarged retainers or combinations thereof, may also be employed.

The rollers 22 and 24 may be formed of any suitable material, such as a high strength metal, plastic, etc. The inner roller portion 26 can be formed by any process, such as machining the inner roller portion 26 from a cylindrical piece or molding it to the desired size and configuration.

According to the present invention, means are provided for rotatingly and eccentrically mounting the roller on the conveyor 10 such that the outer article engaging surface 20 of the roller rotates eccentrically during rotation of the roller.

The eccentric mounting means comprises the drive shaft 44 having a cross-section which matches the configuration of the through bore 26 formed in the rollers, such as roller 24 shown in FIG. 2. The drive shaft 44 extends through the aligned bores 26 in the rollers 22 and 24 in each set of rollers and is secured thereto by conventional means. If a hexagonal or square shaped drive shaft 44 is utilized, the flats of the drive shaft mate with the flats of the bore 26 in each of the rollers 22 and 24 to secure the rollers thereon and to rotatingly drive the rollers upon rotation of the drive shaft 44. If a circular cross-sectional drive shaft 44 is utilized, the rollers, such as roller 24, are pinned in the desired position along the length of the drive shaft 44.

Means are provided for rotating the drive shaft 44. As shown in FIG. 1, by way of example, the drive means comprises a pair of sprockets 46 mounted on one end of the drive shaft 44. A conventional chain assembly, not shown, is connected on the sprockets 46 and driven by a motor to rotate the drive shaft 44. Alternately, a miter gear assembly, pulleys, etc., may also be utilized.

The means for eccentrically mounting each of the rollers 22 and 24 on the drive shaft 44 also includes offsetting the transversely extending bores 28 in each of the rollers 22 and 24 from the transverse center of each of the rollers 22 and 24. As shown in FIG. 2, the transversely extending bore 28 in the inner roller portion 26 of each roller, such as roller 24, is offset from the transverse center of the inner roller portion 26 towards one edge of the inner roller 26 to eccentrically offset the roller 26 on the drive shaft 44. The amount of offset can be selected for the particular application of the conveyor 10 and the articles 12 to be conveyed therealong. For example, a typical range of eccentricity for each of the rollers is between 0.020 and 0.060 inches.

As shown in FIG. 2, the eccentricity is achieved by varying the dimensions indicated by dimension lines 50 and 52. The dimension indicated by line 50 is made greater than the corresponding dimension indicated by line 52 so as to locate the transverse bore 28 in the inner roller portion 26 closer to one peripheral edge of the roller than the opposite edge. In this manner, when the inner roller portion 26 is mounted on the drive shaft 44, the outer article engaging surface 20 will move in an eccentric path about the drive shaft 44.

It is preferred that each roller in each set of rollers, such as rollers 22 and 24, be provided with the same amount of eccentric motion and, more importantly, have the offset portions, such as that indicated by dimension lines 50 and 52 in FIG. 2, disposed in the same angular orientation about the drive shaft 44. In this manner, the outer article engaging surface 20 of each roller 22 and 24 will move simultaneously in the same eccentric path about the drive shaft 44. However, it is also possible to offset the eccentric portions of each roller 22 and 24 about the common drive shaft 44 to account for different article conveyor engaging surfaces, etc.

In a conventional conveyor 10, as shown in FIG. 3, a plurality of roller means are aligned side-by-side along the length of the conveyor 10. Each set of rollers may include one or more rollers, as shown in FIG. 1. As shown in FIG. 3, six sets of rollers 60, 62, 64, 66, 68 and 70 are mounted side-by-side along conveyor 10. By way of example, each of the rollers in each set of rollers is provided with the same amount of offset. Furthermore, each roller in each set of rollers has the offset portions disposed in the same angular position about its drive shaft 44.

Again, it will be noted that adjacent sets of rollers as well as each roller in each set of rollers may have the offset portions disposed in the same or different angular position about its drive shaft depending upon the configuration of the articles to be conveyed along the conveyor 10.

For clarity, as shown in FIG. 3, the offset portion of the roller 62 is disposed with its greatest off-set dimension initially upward from the axis of the drive shaft 44, while the adjacent rollers 60 and 64 have the larger offset dimension disposed in a downward-facing direction, 180° from that of roller 62. The rollers 66, 68, and 70 follow the same alternating offset arrangement such that alternating rollers, such as rollers 62, 66 and 70, will have the larger offset dimension initially oriented in an upwardly-extending direction, while the remaining rollers 60, 64 and 68 will have the larger offset dimension initially facing downward.

Thus, alternating pairs of rollers will engage the bottom surface of the article 12 and propel the article 12 along the conveyor 10. As the rollers rotate, the smaller offset portions of these rollers will rise above the center line of the aligned drive shafts 44 but will be spaced from the bottom surface of the part 12, as shown for roller 64. At this time, however, the larger offset portions of rollers 60, 64 and 66 will be above the center line of the drive shafts 44 to engage and continue to propel the article 12 along the conveyor 10.

Although successive rollers have been disposed with like offset portions positioned 180° apart, it will be understood that angular orientations other than 180° may also be employed. Further, the angular position of the offset portions of successive rollers may vary between rollers as well as the amount of offset of each set of rollers varying along the length of the conveyor 10.

What is claimed is:

1. In a roller conveyor comprising a frame, a plurality of conveyor roller means rotatably mounted in said frame and cooperatively defining an article conveying path lying in an approximate first general plane commonly tangent to the uppermost surfaces of said roller means, and drive means for driving said roller means in coordinated rotation to advance articles supported upon said roller means along said path;

the improvement wherein each of the said plurality of roller means comprises:

a roller drive shaft mounted in said frame for rotation about its shaft axis, a cylindrical inner roller member mounted on said shaft for rotation therewith with the axis of said inner roller member fixedly located in parallel offset eccentric relationship to the shaft axis, and a hollow cylindrical outer roller member coaxially received upon said inner roller member and frictionally engaged therewith, and wherein a first group of said roller means are coupled to said drive means for in-phase eccentric rotation about their shaft axes with said shaft axes lying in a common general plane parallel to said first general plane, and a second group of said roller means are coupled to said drive means for in-phase eccentric rotation about their shaft axes with said shaft axes parallel to the axes of said first group of roller means and lying in said common general plane, the roller means of said second group being interposed between the roller means of said first group and the phase of rotation of said second group of roller means differing from the phase of rotation of said first group whereby said first general plane of said conveying path is alternately defined by said first and by said second group of roller means as said roller means are driven in rotation by said drive means.

2. The invention defined in claim 1 wherein said drive shaft is of regular polygonal transverse cross section and said inner roller member is formed with a passage therethrough of a transverse cross section complementary to that of said shaft for slidably receiving said shaft.

3. The invention defined in claim 1 or claim 2 wherein the phase of rotation of said first group of roller means is 180 degrees out of phase with the phase of rotation of said second group of roller means.

* * * * *